United States Patent
Arai (10) Patent No.: US 9,591,259 B2
(45) Date of Patent: Mar. 7, 2017

(54) DISPLAY DEVICE AND DISPLAY METHOD

(71) Applicant: Yutaka Arai, Tokyo (JP)

(72) Inventor: Yutaka Arai, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 72 days.

(21) Appl. No.: 14/433,019

(22) PCT Filed: Oct. 12, 2012

(86) PCT No.: PCT/JP2012/076532
§ 371 (c)(1),
(2) Date: Apr. 1, 2015

(87) PCT Pub. No.: WO2014/057586
PCT Pub. Date: Apr. 17, 2014

(65) Prior Publication Data
US 2015/0244974 A1  Aug. 27, 2015

(51) Int. Cl.
*H04N 7/00* (2011.01)
*H04N 7/025* (2006.01)
*G09G 5/00* (2006.01)
*G09G 5/02* (2006.01)
*H04N 9/64* (2006.01)

(52) U.S. Cl.
CPC .............. *H04N 7/025* (2013.01); *G09G 5/00* (2013.01); *G09G 5/02* (2013.01); *H04N 9/64* (2013.01); *G09G 5/028* (2013.01); *G09G 2320/0613* (2013.01); *G09G 2320/08* (2013.01); *G09G 2340/0492* (2013.01); *G09G 2340/08* (2013.01); *G09G 2380/08* (2013.01)

(58) Field of Classification Search
CPC ........................................................ H04N 7/00
USPC .................................................. 348/552–558
See application file for complete search history.

(56) References Cited

U.S. PATENT DOCUMENTS

| | | | | |
|---|---|---|---|---|
| 2,811,578 A | * | 10/1957 | Rieke ...................... | H04N 11/02 348/438.1 |
| 5,420,938 A | * | 5/1995 | Funada ..................... | G06T 5/20 358/529 |
| 6,760,133 B1 | * | 7/2004 | Yamada ................... | G03G 15/01 358/538 |
| 2010/0202000 A1 | * | 8/2010 | Gotoh ...................... | H04N 1/46 358/1.9 |

(Continued)

FOREIGN PATENT DOCUMENTS

| | | |
|---|---|---|
| JP | 02-162395 A | 6/1990 |
| JP | 2000-330542 A | 11/2000 |

(Continued)

OTHER PUBLICATIONS

International Search Report (ISR) (PCT Form PCT/ISA/210), in PCT/JP2012/076532, dated Jan. 8, 2013.

*Primary Examiner* — Paulos M Natnael
(74) *Attorney, Agent, or Firm* — McGinn IP Law Group, PLLC (57) ABSTRACT

A control unit determines the content of a video based on an input video signal based on results of determination utilizing a monochrome determination unit and a text determination unit. Based on a display mode according to a result of the content determination, the control unit displays an image corresponding to the input video signal on a display panel.

9 Claims, 5 Drawing Sheets

(56) References Cited

U.S. PATENT DOCUMENTS

2011/0102476 A1* 5/2011 Chang ............... G09G 3/3413
345/690

FOREIGN PATENT DOCUMENTS

| JP | 2004-159986 A | 6/2004 |
| JP | 2004-240108 A | 8/2004 |
| JP | 2006-126528 A | 5/2006 |
| WO | WO 2012/132050 A1 | 10/2012 |

* cited by examiner

DISPLAY DEVICE AND DISPLAY METHOD

TECHNICAL FIELD

The present invention relates to a display device and a display method for displaying various types of images.

BACKGROUND ART

A known display device can handle display modes, such as a normal mode, a newspaper mode, and a DICOM (Digital Imaging and Communication in Medicine) mode, to display various types of images. In the normal mode, a normal color image is displayed naturally. In the newspaper mode, characters in a newspaper are displayed in a manner similar to that of the newspaper. The DICOM mode has a gray scale so as to faithfully reproduce light and shadow of an X-ray image, as shown, for example, in Patent Document 1.

PRIOR ART DOCUMENT

Patent Document

Patent Document 1: Japanese Unexamined Patent Application, First Publication No. 2004-159986.

DISCLOSURE OF INVENTION

Problem to be Solved by the Invention

The above-described display device can display various types of images. However, in such a display device, the user needs to manually switch the mode for each image to be displayed, which does not produce preferable operability.

In consideration of the above problem, an object of the present invention is to provide a display device and a display method, by which an appropriate mode can be set in accordance with the content of an input video signal and various types of input video signals can be optimally displayed.

Means for Solving the Problem

In consideration of the above problem, the present invention has a mode which is a display device comprising:
a display unit;
a determination unit that determines whether or not a video content based on an input video signal is monochrome or color; and
a control unit that sets a display mode according to a result of the above determination and makes the display unit display an image corresponding to the input video signal in the display mode.

The present invention also has a mode which is a display method comprising:
a step, performed by a display unit, of determining whether or not a video content based on an input video signal is monochrome or color; and
a step, performed by a control unit, of setting a display mode according to a result of the above determination and displaying an image corresponding to the input video signal in the display mode.

Effect of the Invention

According to the present invention, the content of the input video signal is determined, and the display mode is set based on the determined content of the input video signal. Therefore, no user's manual operation is necessary and an optimum image can be displayed on the display unit according to the set mode.

MODE FOR CARRYING OUT THE INVENTION

Below, embodiments of the present invention will be explained with reference to the drawings.

First Embodiment

Figure 1:
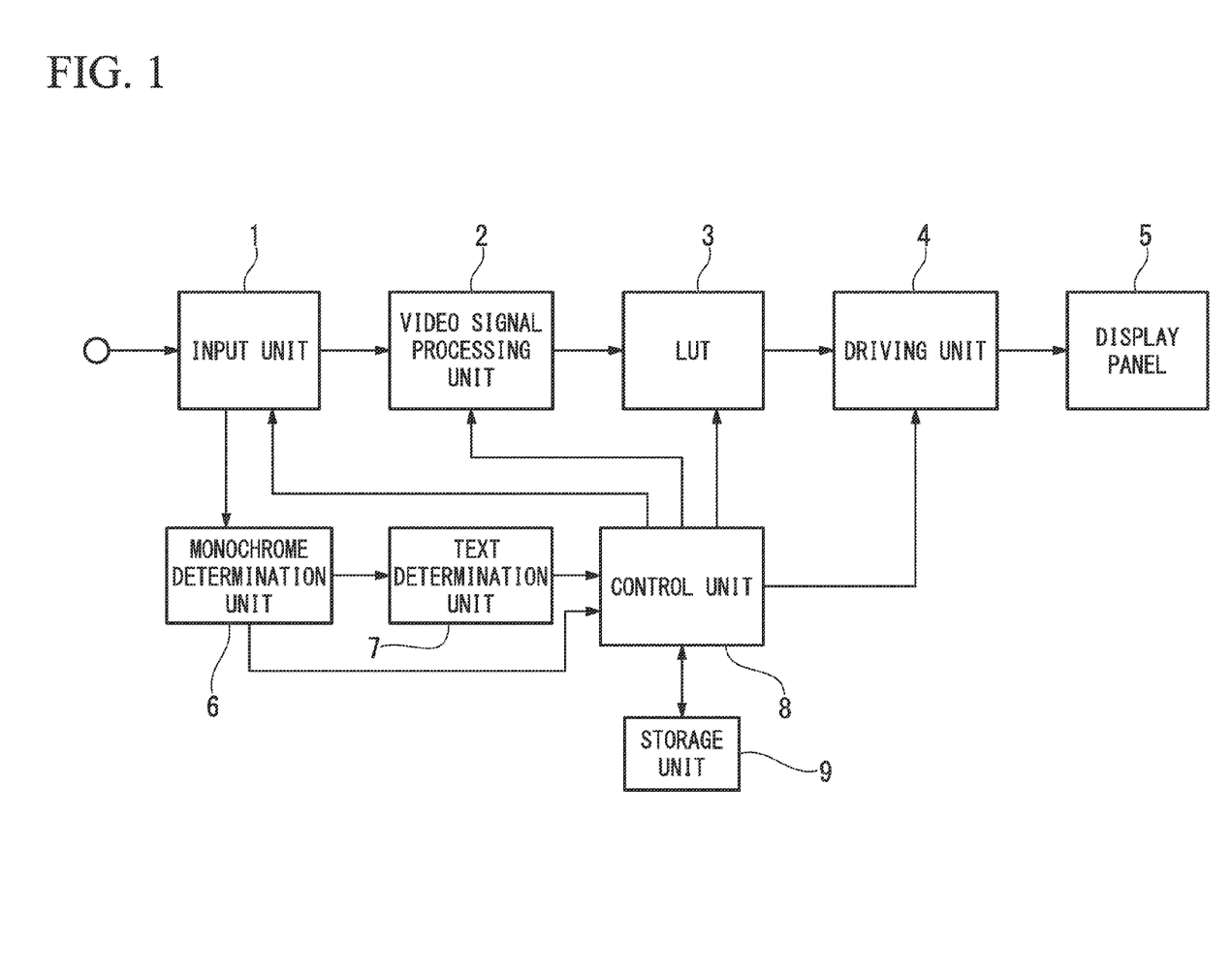
FIG. 1 is a general block diagram that indicates the structure of a display device according to a first embodiment of the present invention.

FIG. 1 is a general block diagram that indicates the structure of a display device according to a first embodiment of the present invention. As shown in FIG. 1, the display device according to the first embodiment of the present invention has an input unit 1, a video signal processing unit 2, an LUT (Look Up Table) 3, a driving unit 4, a display panel 5 (display unit), a monochrome determination unit 6, a text determination unit 7, a control unit 8, and a storage unit 9.

The input unit 1 includes a circuit utilized to select an input path for a video signal and a circuit utilized to receive the video signal. If the input video signal is an analog signal, the input unit 1 also includes an A/D (Analog to Digital) converter. If the input video signal is a digital signal, the input unit 1 also includes a reception circuit.

The video signal processing unit 2 includes a circuit utilized to perform a process required to display the input video signal, for example, a circuit for brightness adjustment, scaling, or the like.

The LUT 3 stores a table utilized to perform individual processes suitable for various image display modes (simply called "display modes"), where data for executing the process suitable for each display mode is stored in the storage unit 9. Selectable image display modes include a display mode corresponding to color display, a display mode corresponding to monochromatic display, and a display mode utilized to display text.

As the display mode corresponding to color display, a display mode suitable for displaying a color image can be utilized. More specifically, a normal mode in which a normal color image is reproduced naturally may be employed.

As the display mode corresponding to monochromatic display, a display mode suitable for displaying a monochromatic image can be utilized. More specifically, a DICOM (Digital Imaging and Communication in Medicine) mode may be employed, in which a monochromatic image for medical use can be reproduced utilizing a faithful gray scale.

As the display mode utilized to display text, a display mode for displaying characters on a monochromatic image can be utilized. More specifically, a newspaper mode may be employed, in which characters in a newspaper are displayed in a manner similar to that of the relevant page of the newspaper.

The driving unit 4 includes a driver utilized to drive the display panel 5, and the like. The display panel 5 may be a liquid crystal panel or an organic EL (Electro Luminescence) panel, which displays images. A chassis that supports the display panel has a rotatable form and may be arranged vertically according to the use of the display device. The driving unit 4 may include the LUT 3.

The monochrome determination unit 6 determines whether the input video signal is a color signal or a monochromatic signal. In an example, the monochrome determination unit 6 performs, for data points in a predetermined region in the target image, cumulative addition of each absolute value of difference between R (red) data and G (green) data and each absolute value of difference between B (blue) data and G (green) data and compares the accumulated value with a threshold, so as to determine whether the signal is color or monochrome.

That is, if it is monochrome, the R, G, and B values of each pixel are the same. Therefore, even if the cumulative addition of the difference between R and G data and the difference between B and G data in the predetermined region of the image is performed, the accumulated value is not increased, where it may be increased by noise or the like. In contrast, if the signal is color, the R, G, and B values of each pixel are not the same. Therefore, when the cumulative addition of the difference between R and G data and the difference between B and G data in the predetermined region of the image is performed, the accumulated value reaches the threshold relatively quickly.

Accordingly, for a specific region in an image, when cumulative addition of each absolute value of difference between R and G data and each absolute value of difference between B and G data is performed and the obtained accumulated value is compared with a threshold, (i) if the accumulated value exceeds the threshold, it can be determined that the signal is color, and (ii) if the accumulated value is less than the threshold, it can be determined that the signal is monochrome. Such a method has a merit of omitting the following processes if it is determined that the signal is color.

It is not always necessary to subject all pixels to the cumulative addition. For example, the cumulative addition is applied to every 8 dots so as to reduce the amount of computation and increase the processing speed.

The structure of the monochrome determination unit 6 is not limited to that explained above.

The text determination unit 7 determines whether the input image is a text image or a graphic image. In an example, the text determination unit 7 performs, for an image in a predetermined region, cumulative addition of each absolute value of difference between data values of adjacent pixels and compares the accumulated value with a threshold, so as to determine whether the image is text or a graphic (image).

That is, in most text images, a text image consists of a white background with black characters, and thus each absolute value of the difference between adjacent pixels is relatively large. In contrast, in graphic images, an abrupt change in data value between adjacent pixels is relatively rare and the data value changes gradually in most regions, and thus the accumulated value of the difference between adjacent pixels is relatively small. Accordingly, for a specific region, when cumulative addition of each absolute value of difference between adjacent pixels is performed and the obtained accumulated value is compared with a threshold, (i) if the accumulated value exceeds the threshold, it can be determined that the image is text, and (ii) if the accumulated value is less than the threshold, it can be determined that the image is a graphic.

In the above-described example, the text determination unit 7 determines whether the image is text or a graphic by means of the difference between data values of adjacent pixels. However, determination whether the image is text or a graphic may be performed employing another method.

For example, the text determination unit 7 may divide an image of a predetermined region into a plurality of frequency regions so as to determine whether the image is text or a graphic. Generally, the text image includes many low-frequency and high-frequency components and a small number of middle-frequency components. In contrast, in graphic images, image gradually changes over the whole image and thus includes a relatively larger number of middle-frequency components. Therefore, it is possible to determine whether the image is text or a graphic by divide a target image into a plurality of frequency regions and analyzing each frequency component.

The control unit 8 controls the above-described individual units. The control unit 8 also performs mode setting in accordance with the results of determination of the monochrome determination unit 6 and the text determination unit 7 and transfers data according to the set mode to the LUT 3.

Next, the operation of the display device according to the first embodiment of the present invention will be explained. In FIG. 1, an input video signal input into the input unit 1 is transferred from the input unit 1 to the video signal processing unit 2 and simultaneously to the monochrome determination unit 6. A signal output from the monochrome determination unit 6 is sent to the text determination unit 7.

The monochrome determination unit 6 determines whether the input video signal is a color signal or a monochromatic signal and outputs a determination result to the control unit 8. Based on the determination result, the control unit 8 determines whether the input video signal is color or monochrome. If it is determined to be color, the control unit 8 retrieves data utilized in the normal mode from the storage unit 9 and transferred the data to the LUT 3. If the input video signal is determined to be monochrome, the control unit 8 further determines, based on a determination result from the text determination unit 7, whether the input image is text or a graphic. If it is determined to be text, the control unit 8 retrieves data utilized in the newspaper mode from the storage unit 9. If input image is determined to be a graphic image, the control unit 8 retrieves data utilized in the DICOM mode from the storage unit 9. The control unit 8 transferred the retrieved data to the LUT 3.

On the other hand, the video signal processing unit 2 subjects the input video signal (from the input unit 1) to brightness adjustment, scaling, or the like and then transfers the processed signal to the LUT 3. As described above, when the input video signal is color, data for the normal mode is transferred to the LUT 3; when the input video signal is a monochromatic text image, data for the newspaper mode is transferred to the LUT 3; and when the input video signal is a monochromatic graphic image, data for the DICOM mode is transferred to the LUT 3.

The LUT 3 processes the signal output from the video signal processing unit 2 in accordance with the transferred data. For example, when the input video signal is color, data for the normal mode is effective in the LUT 3, and the LUT 3 processes the relevant input video signal to reproduce a normal color image naturally. When the input video signal is a monochromatic text image, the LUT 3 executes a process to set the white color temperature of the display screen to a value close to the color temperature of a newspaper. When the input video signal is a monochromatic graphic image, data for the DICOM mode is transferred to the LUT 3, and gradation characteristics is applied to the video signal so as to faithfully reproduce the gray scale of the image. Here, in the DICOM mode, reproducibility of the gray scale is strictly standardized.

The signal output from the LUT 3 is sent via the driving unit 4 to the display panel 5. Therefore, according to the content of the input video signal, an image based on the input video signal is optimally displayed on the display panel 5.

Figure 2A:
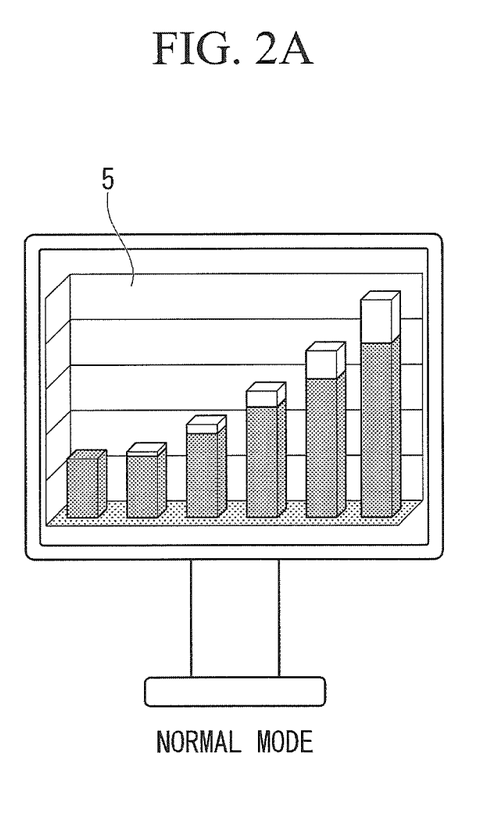
FIGS. 2A to 2C are diagrams utilized to explain displayed images of individual modes.
Figure 2B:
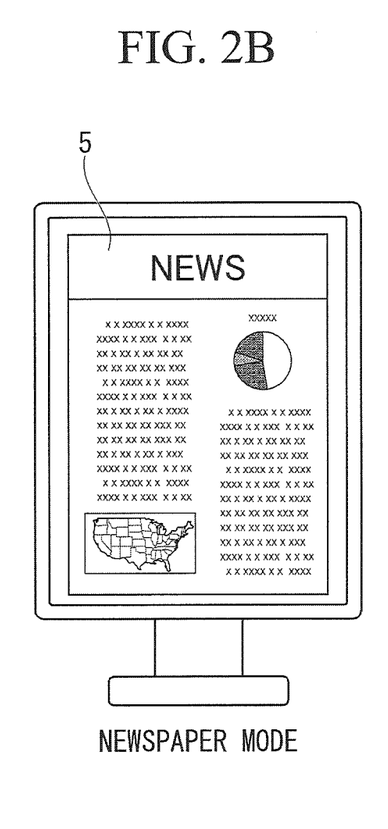
Figure 2C:
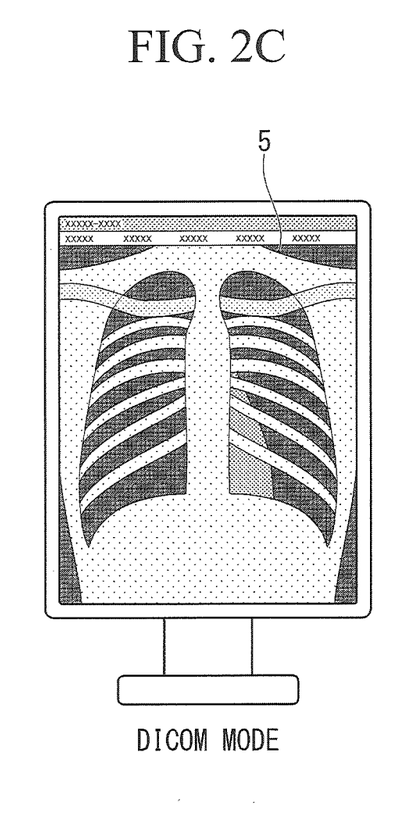

For example, as shown in FIG. 2(A), when the input video signal is color, data for the normal mode is transferred to the LUT 3, and a color image having natural brightness is displayed on the display panel 5. In addition, as shown in FIG. 2B, when the input video signal is a monochromatic text image, data for the newspaper mode is transferred to the LUT 3, and characters are displayed on the display panel 5 in a manner close to that of a newspaper. Additionally, as shown in FIG. 2C, when the input video signal is a monochromatic graphic image, data for the DICOM mode is transferred to the LUT 3, and an image having light and shadow, which are faithful to those on a roentgenographic screen, is displayed on the display panel 5 in a manner close to that of a newspaper.

Figure 3:
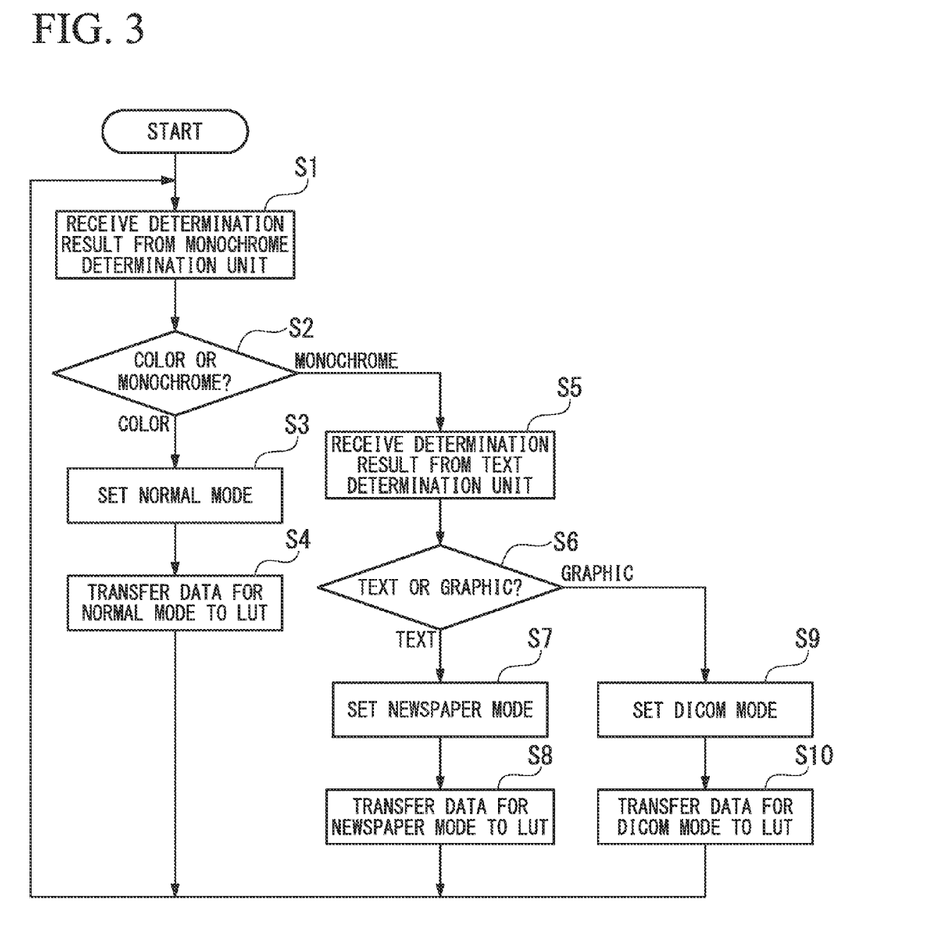
FIG. 3 is a flowchart that shows the operation of a control unit in the display device according to the first embodiment of the present invention.

FIG. 3 is a flowchart that shows the operation of the control unit 8 in the display device according to the first embodiment of the present invention. In FIG. 3, the control unit 8 receives a determination result from the monochrome determination unit 6 (see step S1) and determines whether or not the input video signal is color or monochrome based on the determination result from the monochrome determination unit 6 (see step S2).

In step S2, if it is determined that the input video signal is color, the control unit 8 sets the mode to the normal mode (see step S3). The control unit 8 then retrieves data utilized in the normal mode from the storage unit 9 and transfers the data to the LUT 3 (see step S4).

In step S2, if it is determined that the input video signal is monochrome, the control unit 8 receives a determination result from the text determination unit 7 (see step S5) and determines whether or not the input image is text or a graphic based on the determination result from the text determination unit 7 (see step S6).

In step S6, if it is determined that the input image is text, the control unit 8 sets the mode to the newspaper mode (see step S7). The control unit 8 then retrieves data utilized in the newspaper mode from the storage unit 9 and transfers the data to the LUT 3 (see step S8). In step S6, if it is determined that the input image is a graphic, the control unit 8 sets the mode to the DICOM mode (see step S9). The control unit 8 then retrieves data utilized in the DICOM mode from the storage unit 9 and transfers the data to the LUT 3 (see step S10).

As described above, in the display device according to the first embodiment of the present invention, the display mode is set in accordance with the content of the input video signal, and data is transferred to the portable terminal 3 based on the set mode. Therefore, an optimum image according to the set mode is displayed on the display panel 5. Specifically, when the input video signal is color, data for the normal mode is transferred to the LUT 3, so that a natural color image is displayed on the display panel 5. When the input video signal is a monochromatic text image, data for the newspaper mode is transferred to the LUT 3, so that characters are displayed on the display panel 5 in a manner close to that of a newspaper. When the input video signal is a monochromatic graphic image, the mode of the LUT 3 is set to the DICOM mode, so that a roentgenographic image or the like is faithfully displayed on the display panel 5.

Second Embodiment

Figure 4:
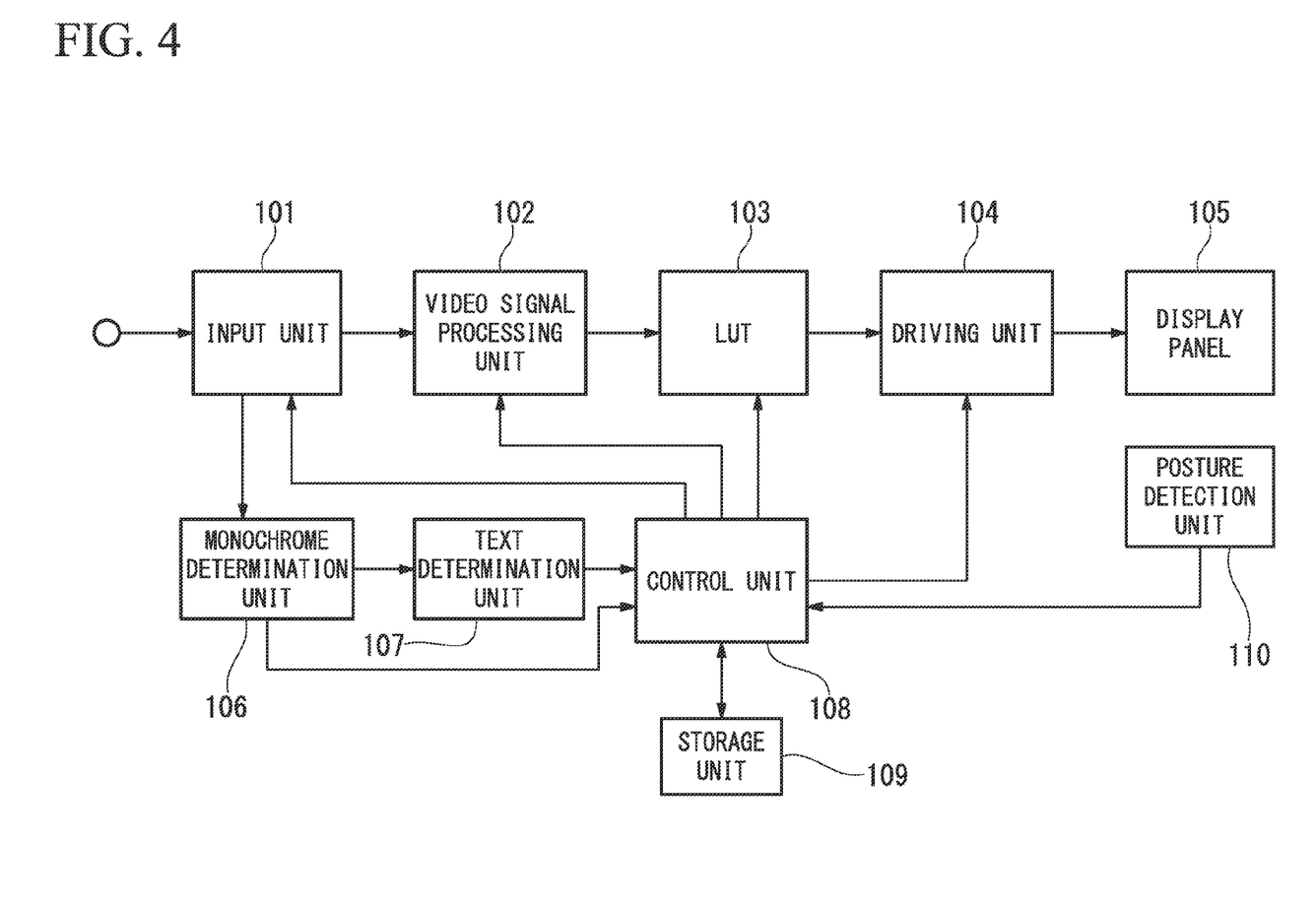
FIG. 4 is a general block diagram that indicates the structure of a display device according to a second embodiment of the present invention.

Next, a second embodiment of the present invention will be explained. FIG. 4 is a general block diagram that indicates the structure of a display device according to the second embodiment of the present invention. As shown in FIG. 4, the display device according to the second embodiment of the present invention has an input unit 101, a video signal processing unit 102, an LUT 103, a driving unit 104, a display panel 105, a monochrome determination unit 106, a text determination unit 107, a control unit 108, a storage unit 109, and a posture detection unit 110.

The input unit 101, the video signal processing unit 102, the LUT 103, the driving unit 104, the display panel 105, the monochrome determination unit 106, the text determination unit 107, the control unit 108, and the storage unit 109 are respectively equivalent to the input unit 1, the video signal processing unit 2, the LUT 3, the driving unit 4, the display panel 5, the monochrome determination unit 6, the text determination unit 7, the control unit 8, and the storage unit 10 in the first embodiment.

In the present embodiment, the chassis that supports the display panel 105 has a rotatable form, and the display panel 105 can be arranged horizontally or vertically according to user's application. The posture detection unit 110 detects the posture (direction of the arrangement) of the display panel 105. An acceleration sensor or a mechanical switch may function as the posture detection unit 110. A detection output signal from the posture detection unit 110 is sent to the control unit 108.

As shown in FIGS. 2A to 2C, when text of a newspaper is displayed (see FIG. 2B) or a roentgenographic image is displayed (see FIG. 2C), the display panel is arranged vertically in most cases. Therefore, in the present embodiment, when it is determined, based on the detection output signal from the posture determination unit 110, that the display panel 105 is being arranged vertically, the video signal is determined to be monochrome regardless of the determination result from the monochrome determination unit 106.

Figure 5:
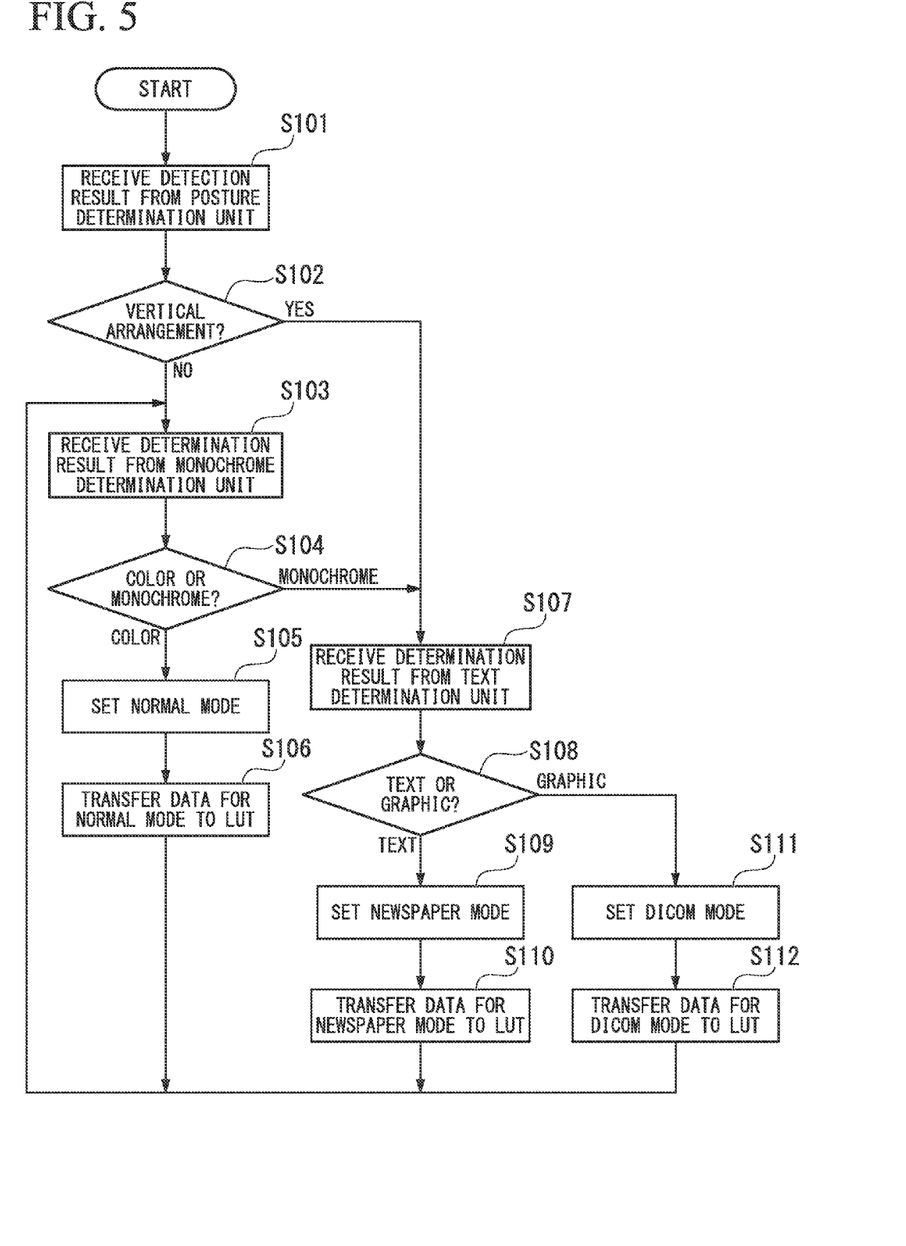
FIG. 5 is a flowchart that shows the operation of a control unit in the display device according to the second embodiment of the present invention.

FIG. 5 is a flowchart that shows the operation of the control unit 108 in the display device according to the second embodiment of the present invention. In FIG. 5, the control unit 108 receives a detection result from the posture determination unit 110 (see step S101) and determines whether or not the vertical arrangement is now effective based on the detection result from the posture determination unit 110 (see step S102). If the vertical arrangement is not effective (i.e., "NO" in step S102), the control unit 108 receives a determination result from the monochrome determination unit 106 (see step S103) and determines whether or not the input video signal is color or monochrome based on the determination result from the monochrome determination unit 106 (see step S104).

In step S104, if it is determined that the input video signal is color, the control unit 108 sets the mode to the normal mode (see step S105). The control unit 108 then retrieves data utilized in the normal mode from the storage unit 109 and transfers the data to the LUT 103 (see step S106).

If it is determined in step S102 that the vertical arrangement is effective, or if it is determined in step S104 that the input video signal is monochrome, the control unit 108 receives a determination result from the text determination unit 107 (see step S107) and determines whether or not the input image is text or a graphic based on the determination result from the text determination unit 107 (see step S108).

In step S108, if it is determined that the input image is text, the control unit 108 sets the mode to the newspaper mode (see step S109). The control unit 108 then retrieves data utilized in the newspaper mode from the storage unit 109 and transfers the data to the LUT 103 (see step S110). In step S108, if it is determined that the input image is a graphic, the control unit 108 sets the mode to the DICOM mode (see step S111). The control unit 108 then retrieves data utilized in the DICOM mode from the storage unit 109 and transfers the data to the LUT 103 (see step S112).

As described above, since the second embodiment employs the posture determination unit 110 that detects the posture of the display panel 105, whether the image is color or monochrome can be determined immediately based on the direction for the arrangement of the display panel 105, which is detected by the posture determination unit 110.

In the above-described example, if it is determined based on the detection result from the posture determination unit 110 that the vertical arrangement is not effective, then it is further determined whether or not the signal is color or monochrome, based on the determination result from the monochrome determination unit 106. However, when it is determined that the vertical arrangement is not effective, based on the detection result from the posture determination unit 110, it may be determined that the signal is color. In this case, the monochrome determination unit 6 can be omitted.

In the above first and second embodiments, mode switching is performed utilizing both of the determination about whether color or monochrome and the determination about whether text or a graphic. However, the mode may be set utilizing one of the "color or monochrome" determination and the "text or a graphic" determination. For example, the mode may be set to the color mode or the monochromatic mode by only performing the "color or monochrome" determination. In addition, the mode may be set to the text mode or the graphic mode by only performing the "text or a graphic" determination.

Also in the above first and second embodiments, signal determination is always performed so as to perform the mode switching in real time. However, a hysteresis condition may be applied to the mode change. For example, the mode can be changed only when a condition required to change the mode has been continuously satisfied for a specific period of time. In this case, it is possible to prevent the mode from being frequently changed.

A program for executing the individual functions of the control unit in FIG. 1 may be stored in a computer readable storage medium, and the program stored in the storage medium may be loaded and executed on a computer system, so as to perform the relevant operation. Here, the computer system has hardware resources which include an OS and peripheral devices.

If the computer system employs a WWW system, the computer system can provide a homepage service (or viewable) environment.

The above computer readable storage medium is a storage device, for example, a portable medium such as a flexible disk, a magneto optical disk, a ROM, or a CD-ROM, or a memory device such as a hard disk built in a computer system. The computer readable storage medium also covers a device for temporarily storing the program, such as a volatile storage medium in a computer system which functions as a server or client. In addition, the program may execute part of the above-explained functions, or may be a program by which the above-described functions can be executed by a combination of this program and an existing program which has already been stored in the relevant computer system. In addition, the above-described program may be stored in a specific server and distributed via a communication line (due to downloading or the like) in response to a request from other devices.

While embodiments of the present invention have been explained in detail referring to the drawings, specific structures are not limited to those described above. Various design modifications can be made without departing from the scope of the present invention.

The whole or part of the above-described embodiment can be described as, but not limited to, the following supplementary notes.

Supplementary note 1

A display device comprising:
a display unit;
a determination unit that determines whether or not a video content based on an input video signal is monochrome or color; and
a control unit that sets a display mode according to a result of the above determination and makes the display unit display an image corresponding to the input video signal in the display mode.

Supplementary note 2

The display device in accordance with Supplementary note 1, wherein:
when the video content based on the input video signal is color, the determination unit makes the display unit display the image corresponding to the input video signal in a display mode corresponding to color display; and
when the video content based on the input video signal is monochrome, the determination unit makes the display unit display the image corresponding to the input video signal in a display mode corresponding to monochromatic display.

Supplementary note 3

The display device in accordance with Supplementary note 2, wherein:
when the input video signal is monochrome, the determination unit further determines whether or not the video content based on the input video signal is text or a graphic;
if the video content based on the input video signal is a graphic, the control unit makes the display unit display the image corresponding to the input video signal a display mode corresponding to graphics; and if the video content based on the input video signal is text, the control unit makes the display unit display the image corresponding to the input video signal a display mode corresponding to text.

Supplementary note 4

The display device in accordance with Supplementary note 1, further comprising:
a detection unit that detects a posture of the display unit, wherein based on the detected posture of the display unit, the control unit:
  makes the display unit display the image corresponding to the input video signal a display mode corresponding to monochrome if the display unit has a screen whose longer sides are parallel to a vertical direction; and
  makes the display unit display the image corresponding to the input video signal a display mode corresponding to color display if the longer sides of the screen of the display unit are parallel to a horizontal direction.

Supplementary note 5

The display device in accordance with Supplementary note 3, wherein:

the display mode corresponding to text includes a newspaper mode in which a monochromatic text image is displayed in a manner similar to that of a newspaper.

Supplementary note 6

The display device in accordance with Supplementary note 3, wherein:

the display mode corresponding to graphics includes a DICOM mode in which a graphic image for medical use is displayed faithfully.

Supplementary note 7

The display device in accordance with Supplementary note 1, wherein:

the determination unit determines whether or not the video content based on the input video signal is monochrome or color, based on data values of individual colors.

Supplementary note 8

The display device in accordance with Supplementary note 3, wherein:

the determination unit determines whether the video content is text or a graphic, based on difference between data values of adjacent pixels.

Supplementary note 9

The display device in accordance with Supplementary note 3, wherein:

the determination unit determines whether the video content is text or a graphic by analyzing frequency components of the input video signal.

Supplementary note 10

A display method comprising:

a step, performed by a display unit, of determining whether or not a video content based on an input video signal is monochrome or color; and a step, performed by a control unit, of setting a display mode according to a result of the above determination and displaying an image corresponding to the input video signal in the display mode.

REFERENCE SYMBOLS 1, 101 input unit
2, 102 video signal processing unit
3, 103 LUT
4, 104 driving unit
5, 105 display panel
6, 106 monochrome determination unit
7, 107 text determination unit
8, 108 control unit
9, 109 storage unit
110 posture determination unit

The invention claimed is:

1. A display device comprising:
a display unit;
a determination unit that determines whether or not a video content based on an input video signal is monochrome or color; and
a control unit that sets a display mode according to a result of the above determination and makes the display unit display an image corresponding to the input video signal in the display mode, wherein:
when the video content based on the input video signal is color, the determination unit makes the display unit display the image corresponding to the input video signal in a display mode corresponding to color display;
when the video content based on the input video signal is monochrome, the determination unit makes the display unit display the image corresponding to the input video signal in a display mode corresponding to monochromatic display;
when the input video signal is monochrome, the determination unit further determines whether or not the video content based on the input video signal is text or a graphic;
if the video content based on the input video signal is a graphic, the control unit makes the display unit display the image corresponding to the input video signal a display mode corresponding to graphics; and
if the video content based on the input video signal is text, the control unit makes the display unit display the image corresponding to the input video signal a display mode corresponding to text.

2. The display device in accordance with claim 1, wherein:
the display mode corresponding to text includes a newspaper mode in which a monochromatic text image is displayed in a manner similar to that of a newspaper.

3. The display device in accordance with claim 1, wherein:
the display mode corresponding to graphics includes a DICOM mode in which a graphic image for medical use is displayed faithfully.

4. The display device in accordance with claim 1, wherein:
the determination unit determines whether or not the video content based on the input video signal is monochrome or color, based on data values of individual colors.

5. The display device in accordance with claim 1, wherein:
the determination unit determines whether the video content is text or a graphic, based on a difference between data values of adjacent pixels.

6. The display device in accordance with claim 1, wherein:
the determination unit determines whether the video content is text or a graphic by analyzing frequency components of the input video signal.

7. 1 A display device comprising:
a display unit;
a determination unit that determines whether or not a video content based on an input video signal is monochrome or color;
a control unit that sets a display mode according to a result of the above determination and makes the display unit display an image corresponding to the input video signal in the display mode; and
a detection unit that detects a posture of the display unit, wherein based on the detected posture of the display unit, the control unit:
makes the display unit display the image corresponding to the input video signal a display mode corresponding to monochrome if the display unit has a screen whose longer sides are parallel to a vertical direction; and
makes the display unit display the image corresponding to the input video signal a display mode corresponding to color display if the longer sides of the screen of the display unit are parallel to a horizontal direction.

8. A display method comprising:
a determination step, performed by a determination unit, of determining whether or not a video content based on an input video signal is monochrome or color; and a control step, performed by a control unit, of setting a display mode according to a result of the determination step and making a display unit displaying an image corresponding to the input video signal in the display mode, wherein:

when the video content based on the input video signal is color, the determination step makes the display unit display the image corresponding to the input video signal in a display mode corresponding to color display;

when the video content based on the input video signal is monochrome, the determination step makes the display unit display the image corresponding to the input video signal in a display mode corresponding to monochromatic display;

when the input video signal is monochrome, the determination step further determines whether or not the video content based on the input video signal is text or a graphic;

if the video content based on the input video signal is a graphic, the control step makes the display unit display the image corresponding to the input video signal a display mode corresponding to graphics; and if the video content based on the input video signal is text, the control step makes the display unit display the image corresponding to the input video signal a display mode corresponding to text.

9. A display method comprising:

a determination step, performed by a determination unit, of determining whether or not a video content based on an input video signal is monochrome or color; and a control step, performed by a control unit, of setting a display mode according to a result of the determination step and making a display unit display an image corresponding to the input video signal in the display mode; and a detection step, performed by a detection unit, of detecting a posture of the display unit, wherein based on the detected posture of the display unit, the control step:

makes the display unit display the image corresponding to the input video signal a display mode corresponding to monochrome if the display unit has a screen whose longer sides are parallel to a vertical direction; and makes the display unit display the image corresponding to the input video signal a display mode corresponding to color display if the longer sides of the screen of the display unit are parallel to a horizontal direction.

\* \* \* \* \*